3,752,868
METHOD FOR PRODUCING DYEABLE
POLYOLEFIN
Kanji Kaku, Mitsuo Asaba, Yasaka Gondo, and Atsuyuki Kachi, Kanagawaken, and Satoshi Matsumoto, Chiba-ken, Japan, assignors to Chisso Corporation, Osaka, Japan
No Drawing. Original application Nov. 25, 1968, Ser. No. 778,763. Divided and this application May 24, 1971, Ser. No. 146,525
Claims priority, application Japan, Dec. 6, 1967, 42/78,323, 42/78,324
Int. Cl. C08f 27/00, 29/12; D06p 3/06
U.S. Cl. 260—876 R   7 Claims

ABSTRACT OF THE DISCLOSURE

Method for producing dyeable polyolefin which comprises graft-copolymerizing a vinyl monomer containing at least one basic nitrogen atom with a polyolefin to an extent more than half the amount to be included in the final graft-copolymerized polymer and then reacting a non-vinylic acidic compound with thus graft-copolymerized product, preferably in the graft-copolymerizing system. This dyeable polyolefin has excellent dye affinity to acid dyes while retaining excellent mechanical properties of polyolefin.

---

This is a divisional application of patent application S.N. 778,763, filed on Nov. 25, 1968, now abandoned.

This invention relates to a method for producing dyeable polyolefins. More particularly this invention relates to polyolefins having improved hydrophilic properties and excellent dye affinity to acid dyes.

In spite of superior physical properties of polyolefins, their dyeability is inferior because they have no functional groups in their molecules which can act as dye-sites.

Various attempts to introduce functional groups, have been made in order to improve the dyeablility of polyolefins. For example, there have been known various methods such as blending of polymer or polymers containing functional group or groups, graft-copolymerization of monomers, direct introduction of functional group or groups to a polyolefin molecule by chemical agent, or the like.

However, when these known methods are used, it sometimes happens that inherent superior physical properties of polyolefins are injured and moreover even when a certain extent of improvement in dyeability is achieved to disperse dyes and basic dyes, sufficient result cannot always be attained by acid dyes.

It has been found that the presence of basic dye-sites in polyolefin is necessary to make it dyeable to acid dyes but simple provision of such sites alone is not satisfactory. Its reason is considered to lie in that dye-sites are in the state surrounded by hydrophobic polyolefin molecules and the access of hydrophilic dye molecules is prevented.

In order to overcome such a drawback, some processes, e.g. treatment of the surface of shaped articles with acidic chemical agents for the purpose of providing hydrophilic property, treatment of shaped articles containing soluble matter with a solvent to dissolve easily soluble matter out and utilization of capillary remained after dissolution of easily soluble matter as a route of approach for dyes, have been known. However, all these methods are used to treat shaped articles and it is a drawback of these methods that the effect is lost when they are applied to the material before shaping and undergo such steps as heating, melting, shaping, or the like. It is also a drawback of these methods that the shaping is difficult.

For example, the official gazette of Japanese patent publication No. 9,548/1966 discloses a method which relies on blending a small amount of polyamide with poly α-olefin and treating the shaped articles obtained from resultant blend with acidic chemical agents. However, the inventors of the present invention have found that when the treatment with acidic chemical agents is applied to resins before melt-shaping instead of the shaped articles in the above-mentioned method, melt shaping of thus treated resins is difficult or even when the shaping is possible the dyeability acquired is considerably lost.

As a method which has no above-mentioned disadvantage and has some similarity to the art of the present invention, a method described in the official gazette of Japanese patent publication No. 7,134/1963 has been known. This method relies on a mixed graft polymerization which applies, to polypropylene, simultaneously a vinyl monomer containing at least one basic nitrogen atom, one or more of monomers selected from the group consisting of methyl methcrylate, methyl acrylate and styrene, and a vinyl monomer containing carboxylic group or sulfonic acid group. However, since the monomer used consists of three or more of monomers having different graft polymerization velocities and particularly when the polymerization velocity of a vinyl monomer containing a least one basic nitrogen atom is slow, it is necessary to increase the total amount of comonomers to be grafted in order to increase the amount of the said vinyl monomer to be introduced. This results in such a disadvantage as the reduction of an inherent physical property of polypropylene.

Moreover, the use of methyl methacrylate, methyl acrylate, styrene, or the like is itself not economically advantageous.

An object of the present invention is to provide a method for producing dyeable polyolefins which has sufficient dye-affinity even after they undergo operations, such as heating, melting, shaping, etc., in order to overcome the above-mentioned drawback of the conventional methods.

Another object of the present invention is to provide a method for dyeable polyolefins having dye-affinity to dyes, particularly to acid dyes.

Further objects and advantages will be apparent from the description which hereinafter follows.

The present invention consists in a method which comprises graft-copolymerizing a vinyl monomer containing at least one basic nitrogen atom with a polyolefin to an extent more than half the amount to be included in the final graft-copolymerized polymer and then reacting a non-vinylic acidic compound (which will be hereinafter abbreviated as an acidic compound) to the graft-copolymerized product, preferably in the graft-copolymerizing system.

By way of the above-mentioned procedure, it is believed that basic groups introduced at first and the acid groups subsequently introduced, form ion-pairs, salts or other complex and the polyolefin turns to acquire a high molecular weight electrolytic property which gives such appropriate basic and hydrophilic property that the access and the combination of dyes, i.e. acid dyes is possible.

For comparison's sake, the grafting of a vinyl monomer containing at least one basic nitrogen atom and the action of acidic compound are simultaneously carried out, but it has been found that the dyeability of resultant polyolefin is extremely inferior to that of the product of the present invention.

Thus there is a significant meaning in the order or time of grafting of a vinyl monomer containing at least one basic nitrogen atom, and action of an acidic compound in the present invention. Accordingly, so far as the above-mentioned condition is satisfied, there is no limitation in carrying out the graft-copolymerization of a vinyl monomer containing at least one basic nitrogen atom as to the coexistence of another neutral vinyl monomer, e.g. methyl methacrylate, ethyl acrylate, styrene, acrylonitrile, etc.

As a vinyl monomer containing at least one basic nitrogen atom vinyl pyridines, such as 2-vinyl pyridine, 4-vinyl pyridine, 2-methyl-5-vinyl pyridine, propenyl pyridine, etc., N-vinyl cyclic lactams, such as vinyl pyrrolidone, vinyl piperidone, etc., those having a substituent containing vinyl radical in imidazole-, oxazole-, pyrrole- or triazine-ring, N,N-diethyl aminoethyl methacrylate, acrylamide, N-methyl acrylamide, aminostyrene and mixtures of foregoing members are illustrated.

It is preferable to use a vinyl monomer containing at least one basic nitrogen atom in an amount 0.5 to 60 parts by weight based upon the 100 parts by weight of polyolefin. When an amount used is less than 0.5 part by weight, the effectiveness of the present invention regarding dye-affinity is not sufficient, and an amount used is larger than 60 parts by weight, the relative proportion of graft-copolymer is reduced and the proportion of homo-polymer of a vinyl monomer containing at least one basic nitrogen atom is increased; hence is not preferable.

As acidic compounds, acids in general such as acidic compounds containing no vinyl radical, e.g. inorganic acids such as phosphoric acid, sulfuric acid, hydrochloric acid, nitric acid, non-polymerizable organic acids containing carboxylic group such as acetic acid, propionic acid, butyric acid, stearic acid, benzoic acid, amino acid, etc., non-polymerizable organic acids containing sulfonic acid group such as p-toluene sulfonic acid, so-called Lewis acids such as $PCl_3$, $POCl_3$, $BF_3$, acids called Bronsted acids, reagents capable of forming ion-pairs or complex compound such as methyl iodide, lauryl chloride are included.

The reaction time necessary to graft-copolymerizing a vinyl monomer containing at least one basic nitrogen atom to polyolefin in the method of the present invention is preferably about 10 minutes to 5 hours.

Time shorter than 10 minutes is not adequate because the polymerization reaction including grafting reaction does not proceed sufficiently. The reaction longer than 5 hours is not preferable because it does not bring about any advantage. In general, the polymerization of more than half the vinyl monomer containing at least one basic nitrogen atom to be included in the final graft copolymer will be completed in about 10 minutes.

Even at a time, when more than half of the polymerization is attained, it is possible to add an acidic compound defined in the present invention to the polymerization system to carry out simultaneously the processing of polymerization and the action of acid but a preferable result can be obtained when the action of acid in the step after the polymerization is nearly completed.

Resultant graft-copolymer, preferably in the grafting system can be subjected directly to the action of acidic compound, as it is, without undergoing the operation of melting, heating, shaping, etc.

There is no limitation as to the amount of acidic compound used. Sufficient result can be obtained even with such a small amount as less than half the molar equivalent relative to a vinyl monomer containing at least one basic nitrogen atom.

With regard to the method for carrying out graft-copolymerization, various conventional methods, e.g. irradiation of ionic radiant ray to the coexisting system of polyolefin and a monomer, heat polymerization of the system in the presence of a radical polymerization initiator such as peroxide, azo compound or the like, a method which relies on causing polyolefin to be peroxidized or hydroperoxidized in advance with an oxidizing agent or to form free radicals of polyolefin by heat or by a mechanical operation and then contacting a monomer therewith to carry out copolymerization can be adopted.

It is also possible to treat polyolefin in advance with an ionic radiant ray or a radical initiator and then contacting a monomer with irradiated polyolefin to carry out graft-copolymerization.

Among graft-copolymerization reactions, a method which relies on suspending or soaking polyolefin in water, and carrying out the reaction in the presence of a radical initiator, particularly a radical initiator containing at least one higher alkyl radical having straight chain structure of 5 to 22 carbon atoms in a molecule, gives favorable result. In the suspension or soaking, the presence of an organic solvent and/or a sulfactant gives better result.

The present method can be applied to resin, namely its powder before shaping into a shaped product with advantage but it can also be applied to the shaped product.

The polyolefin modified in accordance with the method of the present invention possesses both acidic and basic properties. By the mutual action of these properties, it shows a notable dye-affinity especially to acid dyes.

Acid dyes are most useful dyes in the point of abundance of variety, easiness of availability, simplicity of utilization, superiority of color fastness. It is a notable advantage that the present modified polyolefin can be dyed by such acid dyes with excellent result.

Further the present modified polyolefin contains generally about 2–15% by weight of the component other than polyolefin. Since the amount is relatively small, there is no apprehension of their mechanical properties being effected.

In the past, the modification of dyeability carried out before shaping is usually lost after the process of heating, melting, shaping, etc. but there is no such drawback according to the present method.

Because of the modification of polyolefin during the step before shaping, the shaping operation of various articles has become easier. Compared with the conventional method which resorts to the acid treatment rendered to the surface of shaped articles, it is an economical advantage that even with a small amount of acid, the present method can be carried out and even sulfuric or phosphoric acid which is excluded from the group of useful acid in the conventional method (cf. official gazette of Japanese patent publication No. 9,548/1966, because of inferior effectiveness), can be effectively used in the present method. Since these acids are inexpensive, particularly since phosphoric acid is easily handled, they are advantageous in the practical use in industry.

As above-mentioned, the present modified polyolefins show excellent result to acid dyes but also good dyeability to common disperse dyes or basic dyes. Further due to hydrophilic property, they show superior adhesiveness, antistatic property and moderate water absorption (sweat absorption).

The modified polyolefins prepared according to the method of the present invention can be not only used effectively as they are, i.e. solely, but also they can be mixed with unmodified polyolefins to prepare shaped articles (including fibers) in which the effectiveness of the present invention can be fully exhibited.

The modified polyolefins in which a vinyl monomer component containing at least one basic nitrogen atom is contained in a high concentration, can be diluted up to 12 times.

Following examples are offered by way of illustration. All parts and percentage herein referred to are by weight unless otherwise noted.

EXAMPLE 1

100 parts of crystalline polypropylene powder ($[\eta]=1.72$) and 2 parts of distearoyl peroxide were mixed. 300 parts of 1% aqueous solution of Emal 40 (a surfactant made by Kao Soap Co., sodium lauryl sulfate type) were added to the mixture to produce a suspension. After heated to 85° C. in the atmosphere of air, it was kept at the same temperature for 30 minutes with stirring. The atmosphere of the system was replaced by that of nitrogen, while 8 parts of 2-methyl-5-vinylpyridine were added. After the reaction at 85° C. for 2 hours, 8 parts of concentrated phosphoric acid (above 85%) were added and subjected to reaction for additional 2 hours to produce a powdery product. The analysis showed weight increase by 6.8% relative to the original polypropylene (apparent grafted proportion). This powdery product was thrice boiled with methanol every two hours to extract any homopolymer. The weight increase became 3.9% (grafted proportion).

From the non-extract and extract, films having a thickness of about 80μ were prepared under the conditions of 200° C., atmospheric pressure for 30 seconds and then a pressure of 50 kg./cm.² for 90 seconds. The films were dyed with Acilan Scarlet A, Aizen Tartrazinc Conc., Brilliant Wool Blue FFR and Carbolan Green G125 as acid dyes; Rhodamin B Conc. as a basic dye; and Celliton Fast Rubin S as a disperse dye.

As a result, dyeing was uniform and extremely deep with the acid dyes; deep with the basic dye; and fairly deep with the disperse dye. Also, any fastness (to washing and to light) of these dyed materials were good for practical use.

For comparison's sake, the following two comparative experiments were carried out:

(1) One experiment was carried out under the same reaction conditions as in Example 1, except that 8 parts of 2-methyl-5-vinylpyridine and 8 parts of conc. phosphoric acid were simultaneously used in place of 8 parts of 2-methyl-5-vinylpyridine and subjected to reaction for 4 hours, without following by the addition of conc. phosphoric acid.

Films prepared similarly as in Example 1 from the powdery product thus obtained were not dyed at all with the above-mentioned acid dyes, and slightly dyed even with the basic dye and disperse dye.

(2) Another experiment was carried out under the same reaction conditions as in Example 1, except that 8 parts of 2-methyl-5-vinylpyridine were added and subjected to reaction for 4 hours, without following by the addition of conc. phosphoric acid. Films prepared similarly as in Example 1 from the powdery product thus obtained, and films treated by immersing the above-mentioned films in conc. phosphoric acid at room temperature for 5 minutes, or immersing them in 10% phosphoric acid at 50° C. for one hour, followed by water-washing, were dyed with the dyes used in Example 1.

Thus, they were dyed deeply with the disperse dye; moderately with the basic dye; but scarcely with the acid dyes so that any appreciable difference could not be found when compared with the dyeing of non-treated films, which shows that the after-treatment of shaped articles with phosphoric acid was ineffective.

The dyeing conditions were as follows:
Dyeing concentration—10% owf
Liquor ratio—100
pH in dyeing bath—3 (in case of acid dyes) neutral (in cases of basic and disperse dyes)
Dyeing temperature—100° C.
Dyeing period—one hour Dyed films were then washed by crumpling with acetone, and evaluated.

EXAMPLE 2

A powdery product having an apparent grafted proportion of 7.5% and a grafted proportion of 4.7% was obtained in the same way as in Example 1, except that 8 parts of 2-vinylpyridine were used in place of 8 parts of 2-methyl-5-vinylpyridine, and then 4 parts of conc. hydrochloric acid (concentration 36%) were used in place of 8 parts of conc. phosphoric acid. Films prepared therefrom in the same way as in Example 1, were dyed with the dyes described in Example 1.

Thus, they were dyed extremely deeply with the acid dyes, and deeply with the basic dye and disperse dye, while the fastness also were so sufficient an endurable for practical use.

A sheet having a thickness of 0.3 mm. were prepared under the same conditions as in the preparation of films from the above-mentioned powdery product. Helamic 1200 Clear made by Nippon Paint Co., Ltd. and Urethas 300 made by Toa Chemical Co., Ltd. were coated on the sheet. Indentations were then cut into it by means of a razor blade so that 100 squares having each an area of 1 mm.² could be made within an area of 1 cm.². Thus, the peeling-off degree of the coatings was examined by adhering thereto Cellotape which is a trade name of an adhesive-coated cellophane tape made by Nichiban Co., Ltd., followed by peeling the tape off the sheet toward the direction of 180°. The result was that any of the coatings were not peeled-off at all.

Also when the powdery product was allowed to stand at 250° C., for 120 hours, in the atmosphere of 75% of relative humidity, the hydroscopic rate was as high as 1.4%.

As a comparative example films were similarly prepared from the powdery product obtained in the same way as in Example 2, except that 8 parts of 2-vinylpyridine and 4 parts of conc. hydrochloric acid were simultaneously used in place of 8 parts of 2-vinylpyridine, and subjected to reaction for 4 hours, without following by the addition of conc. hydrochloric acid. The films were dyed with the dyes as described in Example 1. They were not dyed at all with any of them.

EXAMPLE 3

Powdery products were obtained in the same way as in Example 1, except that 8 parts of 4-vinylpyridine were used in place of 8 parts of 2-methyl-5-vinylpyridine, and the acids indicated in a following table were used in place of 8 parts of conc. phosphoric acid, in an amount equimolecular to 4-vinylpyridine wherein stearic acid and methyl iodide were excluded. Films were prepared from these powdery products in the same way as in Example 1, and dyed with the dyes described in the example. Thus, results shown in the following Table 1 were obtained.

TABLE 1

| Acidic compound | Used amount (part) | Apparent grafted proportion (percent) | Grafted proportion (percent) | Evaluation of dyeability | | |
|---|---|---|---|---|---|---|
| | | | | Acid dye | Disperse dye | Basic dye |
| Propionic acid | 5.6 | 7.9 | 3.7 | 5 | 5 | 5 |
| Stearic acid | [1] 4 | 9.8 | 5.2 | 5 | 5 | 4 |
| Conc. phosphoric acid | 8.8 | 6.0 | 2.8 | 5 | 4 | 3 |
| Conc. sulfuric acid | 7.7 | 6.6 | 3.2 | 5 | 4 | 3 |
| n-Butyl phosphate [2] | 14 | 7.3 | 3.5 | 5 | 4 | 4 |
| Methyl iodide | [3] 13.8 | 12.6 | 3.3 | 4 | 4 | 4 |
| Lauryl chloride | 15 | 20.0 | 3.6 | 5 | 5 | 3 |
| | 0 | 7.9 | 2.7 | 2 | 5 | 3 |

[1] Molar ratio of 1/5.3 based upon 4-vinylpyridine.
[2] 45:55 mixture of mono-n-butyl phosphate and di-n-butyl phosphate.
[3] Molar ratio of 1.3/1 based upon 4-vinylpyridine.

NOTE.—Dyeability—5=extremely deep; 4=deep; 3=moderate; 2=faint; 1=extremely faint; 0=entirely undyeable.

EXAMPLE 4

A powdery product having an apparent grafted proportion of 6.7% and a grafted proportion of 4.1% was obtained in the same way as in Example 1, except that to polyethylene powder ($[\eta]=3.20$) prepared by the use of Ziegler-Natta type catalyst, 8 parts of 4-vinylpyridine were used in place of 8 parts of 2-methyl-5-vinylpyridine, and 5 parts of acetic acid were used in place of 8 parts of conc. phosphoric acid. Films were prepared therefrom in the same way as described in Example 1, and dyed with the same dyes as described in the example. They were dyed the most deeply with the acid dyes, and also deeply with the basic and the disperse dye.

EXAMPLE 5

Powdery products were obtained in the same way as in Example 1, except that 8 parts of 4-vinylpyridine (4VP) were used in place of 8 parts of 2-methyl-5-vinylpyridine, and various amounts of conc. phosphoric acid shown in the following table were used in place of 8 parts of conc. phosphoric acid. Films were similarly prepared from these powdery products, and their dyeabilities were examined. The results are shown in the following Table 2.

TABLE 2

| Conc. phosphoric acid (part) | Molar ratio, (4VP/H₃PO₄) | Grafted proportion (percent) | Evaluation of dyeability | | |
|---|---|---|---|---|---|
| | | | Acid dye | Disperse dye | Basic dye |
| 2.3 | 4/1 | 2.9 | 5 | 5 | 4 |
| 0.54 | 16/1 | 5.6 | 5 | 5 | 4 |
| 0.28 | 32/1 | 2.8 | 5 | 5 | 5 |
| 0 | | 2.7 | 2 | 5 | 3 |

The evaluations of dyeability were carried out in accordance with those in Example 3.

EXAMPLE 6

A powdery product was obtained in the same way as in Example 1, except that mixed monomers of 4 parts of 4-vinylpyridine and 3.5 parts of styrene were used in place of 8 parts of 2-methyl-5-vinylpyridine, and 2.2 parts of conc. phosphoric acid were used in place of 8 parts of conc. phosphoric acid. Films prepared from the product were dyed far deeply with acid dyes, when compared with films prepared from a product which was obtained by adding mixed monomers of 4 parts of 4-vinylpyridine and 3.5 parts of styrene and subjecting the mixture to reaction for 4 hours, without following by the reaction with conc. phosphoric acid.

No appreciable difference could be counted between disperse dyes and basic dyes, and the films were dyed deeply in either of the cases.

EXAMPLES 7 TO 10

A suspension was prepared from 100 parts of crystalline polypropylene powders ($[\eta]=1.58$) and 0.7 part of dilauroyl peroxide using 600 parts of 0.5% aqueous solution of Emal 40. It was then heated to 85° C. in the atmosphere of air, and thereafter kept at the same temperature for 30 minutes.

The atmosphere in the system was replaced by that of nitrogen, and 4-vinylpyridine (4VP) or the same material together with styrene (St) was added. After the reaction at 85° C. for 2 hours, conc. phosphoric acid (above 85%) was added and further subjected to reaction at the same temperature for one hour to produce powdery products (Examples 7 to 9). According to the analysis, the reaction efficiencies of the vinyl monomer(s) were above 90% in case of any of the powdery products.

These powdery products as well as a mixture of unmodified polypropylene powders and the powdery product of Example 7 in a proportion of 1:1 (Example 10), were melt-extruded at 200–240° C. and then pelletized. The pellets were subjected to spinning at a spinning temperature of 240–280° C., and the resultant fibers were stretched to 3 to 4 times at 90–130° C. The spinnabilities in the range of the above-mentioned spinning temperatures were good, and in particular, better result was obtained on the low temperature side.

The fibers thus obtained were dyed with Irgalan Yellow GL (abbreviation: IYG), Bayer Acilan Blue GSE abbreviation: (BAB) and Sandoz Brilliant Alizarine Violet FFR (abbreviation: SBA), as acid dyes; Resolin Brillian Yellow PGG (abbreviation: RBY) as a disperse dye; and Rhodamin B conc. (abbreviation: RBC) as a basic dye.

They were dyed well with any of the dyes, and in particular, so deeply with the acid dyes as no fibers obtained heretofore from the common blends of polyolefin with a basic nitrogen-containing polymer or from the grafted polymers of a basic nitrogen-containing monomer could ever be achieved.

The properties of the fibers and the results of dyeing are shown in Table 3, and the test results of the fastnesses relative to Example 8 are shown in Table 4.

The evaluation method of the dyeability is the same with that described in Example 3.

The tests of various fastnesses were carried out according to the following methods:

Fastness—Method  
Sunlight—JIS–L–1044 Fadometer  
Rubbing—JIS–L–10148 Clockmeter  
Washing and dry cleaning—JIS–L–1045 Launderometer

TABLE 3

| Ex. | Feed amounts of 4VP, St and H₃PO₄ (part) | Apparent grafted proportion¹ (percent) | Spinning temperature (° C.) | Denier of monofilament (d.) | Strength (g./d.) | Elongation (percent) | Hygroscopic rate² (percent) | Dyeability | | | | |
|---|---|---|---|---|---|---|---|---|---|---|---|---|
| | | | | | | | | Acid dye | | | Disperse dye RBY | Basic dye RBC |
| | | | | | | | | IYG | BAB | SBA | | |
| 7 | 4VP 7.9 / H₃PO₄ 3.7 | 8.9 | 240 | 11.3 | 4.3 | 44 | 1.47 | 5 | 5 | 5 | 5 | 5 |
| 8 | 4VP 4.0 / H₃PO₄ 1.8 | 5.4 | 280 | 5.8 | 4.0 | 47 | 0.74 | 5 | 5 | 5 | 5 | 3 |
| 9 | 4VP/St 4/3.7 / H₃PO₄ 1.8 | 7.5 | 260 | 7.5 | 3.5 | 51 | 0.63 | 5 | 5 | 4 | 5 | 3 |
| 10 | The same with Example 7³ | (4.5) | 280 | 16.7 | 2.7 | 112 | | 5 | 5 | 5 | 5 | 3 |

¹ Parts by 100 parts of polypropylene.  
² Weight increase after drying at 105° C. for 2 hours, followed by standing for 20 days in a room kept at room temperature and normal humidity.  
³ The product was mixed with unmodified polypropylene in a ratio of 1:1 (part).

TABLE 4

| Dye | Fastness | | | | | |
|---|---|---|---|---|---|---|
| | Sun light | Rubbing | Washing | | Dry cleaning | |
| | | | Discoloration | Stain | Discoloration | Stain |
| IYG | 6–7 | 4–5 | 4–5 | 5 | 5 | 5 |
| BAB | 5 | 5 | 5 | 5 | 5 | 5 |
| SBA | 5 | 5 | 5 | 5 | 5 | 5 |
| RBY | 5–6 | 5 | 5 | 4 | 4 | 4 |

EXAMPLE 11

100 parts of crystalline polypropylene powders ($[\eta]=1.72$) were dispersed into 300 parts of 1% Emal 40 aqueous solution, and the atmosphere in the system was replaced by nitrogen. The mixture thus obtained was heated to 85° C. with stirring, while there was added a mixture of 4-vinylpyridine (4VP) and dilauroyl peroxide (LPO) in the amounts as shown in the following Table 5. The mixture was subjected to reaction at the same temperature for 2 hours. 10% dilute phosphoric acid as an acidic compound was then added in an amount corresponding to half the mol of the added 4-vinylpyridine, followed by further reaction for one hour.

From the reaction mixtures were obtained powdery products having the apparent grafted proportion and the grafted proportion as shown in the Table 5, in the same way as described in Example 1. Further, from these products and the compositions in which the products were diluted with unmodified polypropylene powders, films were prepared and dyed in the same way as described in the example. Thus, the results as shown in the Table 5 were obtained.

Still further, portions of the powdery products were subjected to spinning according to the method described in Examples 7–10, and to dyeing and fastness tests under the conditions shown in the examples. Thus, the results shown in the Tables 6 and 7, were obtained.

TABLE 5

| No. | 4VP feed amount (part) | LPO feed amount (part) | Apparent grafted proportion (percent) | Grafted proportion | Dyeability A | D | B |
|---|---|---|---|---|---|---|---|
| 1 | 1 | 0.05 | 1.2 | 0.9 | 3 | 3 | 4 |
| 2 | 2 | 0.1 | 2.5 | 1.2 | 4 | 4 | 4 |
| 3 | 4 | 0.2 | 5.6 | 3.1 | 5 | 4 | 3 |
| 4[1] | 20 | 1.0 | 23.1 | 13.6 | 5 | 5 | 4 |
| 5[1] | 50 | 2.5 | 51.8 | 21.7 | 4 | 5 | 4 |

[1] The results of the tests relative to the compositions in which the powdery products were diluted with unmodified polypropylene powders ($[\eta]=1.72$) by 5 and 12 times, respectively.

NOTE.—A=Acid dye; D=Disperse dye; B=Basic dye.

TABLE 6

| No. | Spinning temperature (° C.) | Denier of monofilament (d.) | Strength (g./d.) | Elongation (percent) | Hygroscopic rate (percent) | Dyeability IYG | BAB | SBA |
|---|---|---|---|---|---|---|---|---|
| 2 | 240 | 8.2 | 4.4 | 38 | 0.65 | 4 | 4 | 4 |
| 4[1] | 240 | 7.5 | 4.0 | 51 | 0.92 | 5 | 5 | 4 |

[1] See footnote at bottom of Table 5.

TABLE 7
The tests relative to No. 4[1]

| | | | Fastness | | | |
|---|---|---|---|---|---|---|
| | | | Washing | | Dry cleaning | |
| Dye | Sunlight | Rubbing | Discoloration | Stain | Discoloration | Stain |
| IYG | 6–7 | 4–5 | 4–5 | 5 | 4 | 4 |
| BAB | 5 | 5 | 5 | 5 | 5 | 5 |
| SBA | 5 | 5 | 5 | 5 | 5 | 5 |

[1] See footnote at bottom of Table 5.

EXAMPLE 12

A powdery product having an apparent grafted proportion of 5.7% and a grafted proportion of 4.1%, was obtained in the same way as in Example 1, except that 6 parts of 4VP and 0.3 part of LPO, and further, phosphoric acid in an amount equimolecular to 4VP, were used.

Films prepared from the powdery product in the same way as in Example 1, were subjected to the determination of antistatic property in which the electrostatic reduction rate after 30 seconds was observed by the use of Static Honest Meter (made by Shishido Shokai). The rate was 69%. A comparative test was carried out using films prepared from unmodified polypropylene. The films scarcely showed the reduction in electrostaticity even after a long period of time.

What is claimed is:

1. In the process of graft-copolymerizing a polyolefin with a vinyl monomer having at least one basic nitrogen atom wherein:
   (a) said vinyl monomer is selected from the group consisting of 2-vinyl pyridine, 4-vinyl pyridine, 2-methyl-5-vinyl pyridine, propenyl pyridine, vinyl pyrrolidone, vinyl-piperidone, a vinyl-substituted imidazole, a vinyl-substituted oxazole, a vinyl-substituted pyrrole, a vinyl-substituted triazine, N,N-dimethyl aminoethyl methacrylate, acrylamide, N-methyl acrylamide, aminostyrene and mixtures of the foregoing members,
   (b) said polyolefin is selected from the group consisting of polypropylene and polyethylene and
   (c) the ratio of said vinyl monomer to said polyolefin is within the range of about 0.5 to 60 parts by weight of vinyl monomer per 100 parts by weight of polyolefin, the improvement which comprises:
   (1) causing said graft-copolymerization to proceed until more than half of the final vinyl monomer content of the recovered graft copolymer has been graft-copolymerized, and then
   (2) introducing a non-vinylic acidic compound into the graft copolymerization system before the graft-copolymerization is completed, and reacting the thus introduced acidic material with the graft-copolymerization product that has formed while the graft-copolymerization proceeds to the final vinyl monomer content, and
   (3) recovering a graft-polymerization product having excellent dye affinity to acid dyes.

2. A process according to claim 1 wherein said acidic compound is selected from the group consisting of:
   (a) inorganic acids,
   (b) non-polymerizable organic acids containing a carboxyl group,
   (c) non-polymerizable organic acids containing a sulfonic acid group,
   (d) Lewis acids,
   (e) Bronsted acids,
   (f) methyl iodide, and
   (g) lauryl chloride.

3. A process according to claim 1 wherein said acidic material is selected from the group consisting of: phosphoric acid, sulfuric acid, hydrochloric acid, nitric acid, acetic acid, propionic acid, butyric acid, stearic acid, benzoic acid, amino acid, p-toluene sulfonic acid, $PCl_3$, $POCl_3$, $BF_3$, methyl iodine and lauryl chloride.

4. The method of claim 1 wherein said graft-copolymerizing is carried out in the presence of a radical initiator having at least one higher alkyl radical of straight chain structure containing 5 to 22 carbon atoms.

5. The method of claim 1 wherein said graft copolymerizing is carried out in the presence of a radical initiator and in the state of an aqueous dispersion of polyolefin.

6. A dyeable polyolefin obtained according to the method of claim 1.

7. A dyeable polyolefin composition which comprises a dyeable polyolefin obtained according to the method of claim 1 and an unmodified polyolefin, the ratio of the former to the latter being about (1:11) or more, and wherein said unmodified polyolefin is selected from the group consisting of polypropylene or polyethylene.

References Cited

UNITED STATES PATENTS 3,399,251   8/1968   Miller et al. _____ 260—876

FOREIGN PATENTS 879,195   10/1961   Great Britain _____ 260—878

MURRAY TILLMAN, Primary Examiner

H. W. ROBERTS, Assistant Examiner

U.S. Cl. X.R.

8—21 D, 162 R, Dig. 9, Dig. 18; 260—41 C, 878 R; 264—78